(12) United States Patent
Cooney

(10) Patent No.: US 8,680,025 B2
(45) Date of Patent: *Mar. 25, 2014

(54) MICROARRAY SYSTEM

(75) Inventor: Christopher G. Cooney, Severn, MD (US)

(73) Assignee: Akonni Biosystems, Inc., Frederick, MD (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/149,865

(22) Filed: May 9, 2008

(65) Prior Publication Data

US 2009/0280997 A1 Nov. 12, 2009
US 2012/0071355 A9 Mar. 22, 2012

(51) Int. Cl.
*C40B 60/12* (2006.01)

(52) U.S. Cl.
USPC .................................................. 506/39

(58) Field of Classification Search
None
See application file for complete search history.

(56) References Cited

U.S. PATENT DOCUMENTS

| | | | |
|---|---|---|---|
| 4,816,567 | A | 3/1989 | Cabilly et al. |
| 5,641,870 | A | 6/1997 | Rinderkneckt et al. |
| 5,741,700 | A | 4/1998 | Ershov et al. |
| 5,770,721 | A | 6/1998 | Ershov et al. |
| 5,981,734 | A | 11/1999 | Mirzabekov et al. |
| 6,656,725 | B2 | 12/2003 | Mirzabekov et al. |
| 2004/0037739 | A1 | 2/2004 | McNeely et al. |

FOREIGN PATENT DOCUMENTS

| | | |
|---|---|---|
| EP | 1374988 A2 | 2/2004 |
| EP | 1374996 A1 | 2/2004 |
| WO | WO 93/11161 | 6/1993 |
| WO | 03/015922 A1 | 2/2003 |

OTHER PUBLICATIONS

Beck (Jan. 2001) Journal of Clinical Microbiology vol. 39 pp. 29 to 33.*
Weigl (Feb. 24, 2003) Advanced Drug Delivery Reviews pp. 349 to 377.*
He (Jul. 19, 2003) Langmuir vol. 19 pp. 6982 to 6986.*
Keramas (Jan. 16, 2004) Lab on a Chip vol. 4 pp. 152 to 158.*
Liu (Feb. 3, 2006) Analytical Chemistry vol. 78 pp. 1980 to 1986.*
Moran-Mirabal (Dec. 9, 2006) Analytical Chemistry vol. 79 pp. 1109 to 1114.*
Zhang (Mar. 30, 2007) Langmuir vol. 23 pp. 4728 to 4731.*
Holliger, "Diabodies: Small bivalent and bispecific antibody fragments"; Proc. Natl. Acad. Sci. USA; Jul. 1993; pp. 6444-6448; vol. 90.
Supplementary European Search Report issued in EP 08754280, dated Sep. 16, 2011.

* cited by examiner

*Primary Examiner* — Christian Boesen
(74) *Attorney, Agent, or Firm* — Andrews Kurth LLP; Michael Ye

(57) ABSTRACT

A microarray system is disclosed. The microarray system includes a microarray formed on a planar substrate and an incubation chamber formed around the microarray. The incubation chamber has a plurality of interior surfaces including a bottom surface on which the microarray is formed and a top surface that faces the bottom surface and is generally parallel to the bottom surface. At least one of a plurality of interior surfaces is a hydrophilic surface.

15 Claims, 11 Drawing Sheets

MICROARRAY SYSTEM

TECHNICAL FIELD

The technical field is microarray systems and, in particular, microarray systems having an incubation chamber coupled with a one-way valve and/or a waste chamber.

BACKGROUND

Microarrays offer great potential for performing complex analyses of samples by carrying out multiple detection reactions simultaneously. Typically, a microarray of multiple spots of reactant molecules is formed on a planar substrate such as a glass microscope slide, usually in a two-dimensional grid pattern. Liquid sample and reagents are then applied to the slide to contact multiple spots simultaneously. Various reaction steps may be performed with the bound molecules in the microarray, including exposure of bound reactant molecules to the liquid sample and reagents and washing steps. The progress or outcome of the reaction may be monitored at each spot in the microarray in order to characterize either material(s) immobilized on the slide or material(s) in a liquid sample.

Microarray analysis usually requires an incubation period that ranges from minutes to hours. The duration of the incubation period is assay dependent and is determined by a variety of factors, such as the type of reactant, degree of mixing, sample volume, target copy number, and density of the array. During the incubation period, target molecules in the liquid sample must be in intimate contact with the microarray probes. The incubation is usually performed in an incubation chamber. The incubation chamber is typically formed by forming a gasket around the microarray. The gasket is covered with a cover slip to form an enclosed chamber. The cover slip can be made of a transparent material, such as glass, to allow optical interrogation of the microarray after the incubation.

If the cover slip does not have an entry port and a vent, the liquid sample and other reagents need to be added to the incubation chamber before the cover slip is placed on top of the gasket. If the reaction mixture is filled to the rim of the gasket, the reaction mixture may leak out of the side of the gasket, compromising the gasket/cover seal and increasing the risk of contaminating the environment. Cover slips with holes for filling and venting circumvent these two problems. However, filling the incubation chamber through holes on the cover slip often risks the introduction of air bubbles or air pockets into the incubation chamber. Moreover, surface tension of a liquid sample or a reaction mixture may also prevent the liquid sample or reaction mixture from completely filling the incubation chamber. A partially filled chamber may result in a false negative if an air pocket covers an array spot and prevents contact between the array spot and the liquid sample or reaction mixture.

SUMMARY

A microarray system is disclosed. The microarray system includes a microarray formed on a planar substrate and an incubation chamber formed around the microarray. The incubation chamber has a plurality of interior surfaces including a bottom surface on which the microarray is formed and a top surface that faces the bottom surface and is generally parallel to the bottom surface. At least one of the plurality of interior surfaces is a hydrophilic surface.

Also disclosed is a microarray system having a microarray formed on a planar substrate, an incubation chamber formed around the microarray; a dome valve for loading a liquid sample into the incubation chamber; and a channel connecting the one-way valve to the incubation chamber.

DESCRIPTION OF THE DRAWINGS

The detailed description will refer to the following drawings, wherein like numerals refer to like elements, and wherein.

DETAILED DESCRIPTION

Figure 1:
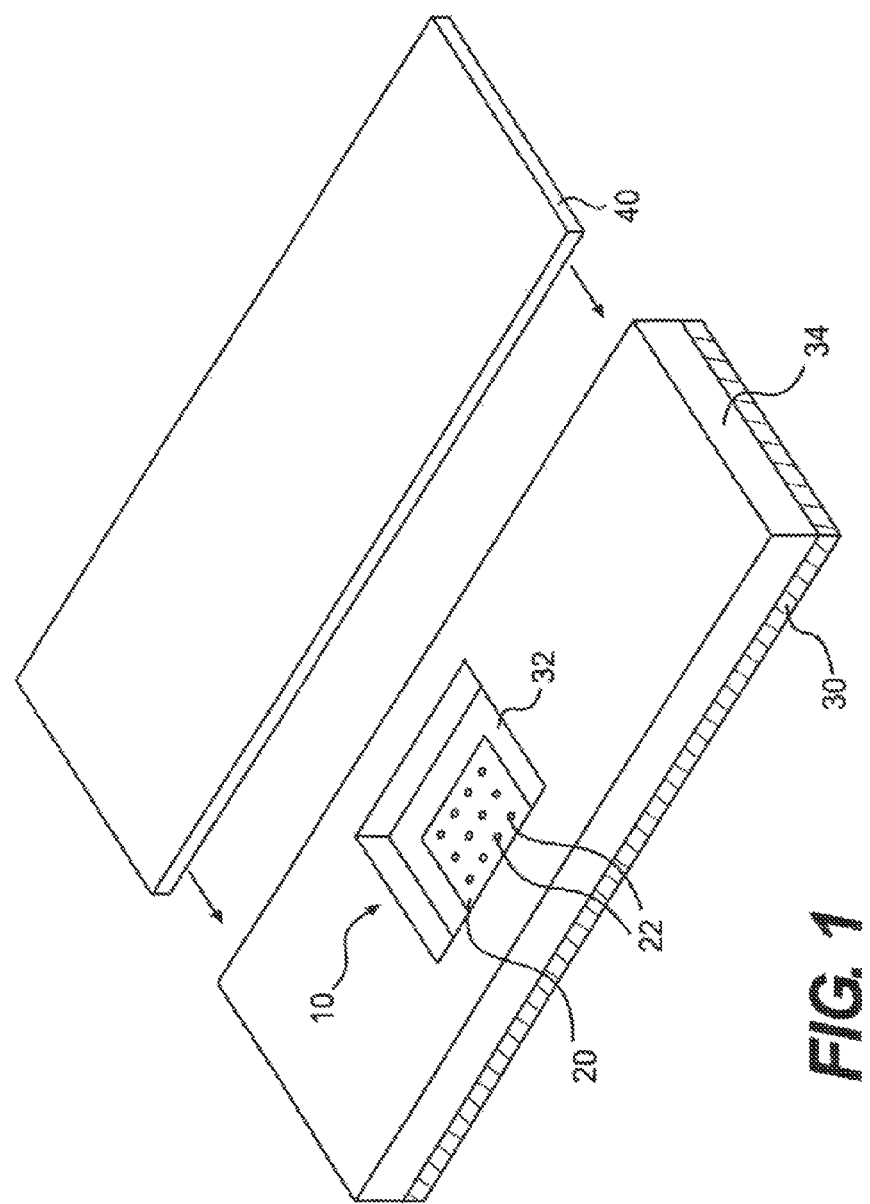
FIG. 1 is a schematic of an embodiment of an incubation chamber of a microarray system.

This description is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "front," "back" "up," "down," "top" and "bottom," as well as derivatives thereof, should be construed to refer to the orientation as then described or as shown in the drawing figure under discussion. These relative terms are for convenience of description and normally are not intended to require a particular orientation. Terms concerning attachments, coupling and the like, such as "connected" and "attached," refer to a relationship wherein structures are secured or attached to one another either directly or indirectly through intervening structures, as well as both movable or rigid attachments or relationships, unless expressly described otherwise.

The term "microarray," as used herein, refers to an ordered array of spots presented for binding to ligands of interest. A microarray consists of at least two spots. The ligands of interest includes, but are not limited to, nucleic acids, proteins, peptides, polysaccharides, antibodies, antigens, viruses, and bacteria.

The term "hydrophilic surface" as used herein, refers to a surface that would form a contact angle of 60° or smaller with a drop of pure water resting on such a surface. The term "hydrophobic surface" as used herein, refers to a surface that would form a contact angle greater than 60° with a drop of pure water resting on such a surface. Contact angles can be measured using a contact angle goniometer.

The term "incubation chamber," as used herein, refers to an enclosed space around a microarray. The incubation chamber, when filled with a liquid sample, allows the microarray to be submerged in the liquid sample so that target molecules in the liquid sample can maintain intimate contact with the microarray probes.

Described herein is a microarray system having an incubation chamber with a hydrophilic surface. The use of a hydrophilic surface that contacts the liquid as it enters the chamber allows complete filling of the incubation chamber.

As noted above, surface tension of a liquid sample or a reaction mixture often prevent the liquid sample or reaction mixture from completely filling a small space, such as the incubation chamber of a microarray system. Surface tension is the result of the attraction between the molecules of the liquid by various intermolecular forces. In the bulk of the liquid, each molecule is pulled equally in all directions by neighboring liquid molecules, resulting in a net force of zero. At the surface of the liquid, the molecules are pulled inwards by other molecules deeper inside the liquid and are not attracted as intensely by the molecules in the neighboring medium (be it vacuum, air or another fluid). Therefore all of the molecules at the surface are subject to an inward force of molecular attraction which can be balanced only by the resistance of the liquid to compression. This inward pull tends to diminish the surface area, and in this respect a liquid surface resembles a stretched elastic membrane. Accordingly, the liquid squeezes itself together until it has the locally lowest surface area possible. The net result is that the liquid may maintain a near-spherical shape inside the small space and does not fill the corners, especially square corners of the small space. The typical small gap that separates the cover from the microarray surface often compresses the liquid into a cylindrical shape.

In the case of microarray systems, the liquid that fills the incubation chamber is most likely a water-based liquid, such as a hybridization buffer or washing buffer. The surface tension of the water-based liquid may be overcome by coating at least a portion of the interior surface of the incubation chamber with a hydrophilic material.

FIG. 1 shows an embodiment of an incubation chamber. In this embodiment, the incubation chamber 10 is formed around a microarray 20, which consists of a plurality of array spots 22 printed or formed on the top surface 32 of a planar substrate 30. The surface 32 also forms the bottom surface of the incubation chamber 10. The top of the chamber 10 is covered with a cover slip 40. The incubation chamber 10 can be of any size or shape that matches the dimension of the planar substrate 30, which is typically a glass or plastic slide.

In this embodiment, the incubation chamber 10 is formed by placing a gasket 34 on top of the planar substrate 30 and covering the gasket 34 with the cover slip 40. In another embodiment, the incubation chamber 10 is formed by creating a pocket or recession area in the planar substrate 30 (by molding or etching, for example), printing the microarray 20 at the bottom of the pocket or recession area, and covering the pocket or recession area with the cover slip 40. In yet another embodiment, the pocket or recession area is formed on the cover slip 40, which is then placed directly on top of the planar substrate 30.

The incubation chamber 10 is usually formed around the microarray 20 so as to reduce the liquid volume needed for a hybridization or any other reactions in the incubation chamber 10. In one embodiment, the incubation chamber has a foot print of about 0.1-10 cm$^2$, preferably about 0.5-5 cm$^2$, and a height of about 0.05-5 mm, preferably about 0.1-1 mm. In one embodiment, the total volume of the incubation chamber is in the range of 1-250 µl.

Depending on its shape, the incubation chamber 10 may have several interior surfaces, including a bottom surface on which the microarray 20 is formed, a top surface that faces downward to the bottom surface and is generally parallel to the bottom surface, and one or more side surfaces. For the purpose of ensuring uniform filling of the incubation chamber 10, not all interior surfaces need to be hydrophilic. In one embodiment, only the top surface of the incubation chamber 10 is hydrophilic. In another embodiment, only the bottom surface of the incubation chamber 10 is hydrophilic. In another embodiment, both the top and bottom surfaces are hydrophilic. In yet another embodiment, all interior surfaces of the incubation chamber are hydrophilic.

A hydrophilic surface is a surface that attracts water. Hydrophilic surfaces typically contain molecules that are charge-polarized and capable of hydrogen bonding. In one embodiment, the planar substrate 30 or the cover slip 40 is made of a hydrophilic material and hence provide a hydrophilic bottom surface or hydrophilic top surface, respectively. In another embodiment, the top surface or the bottom surface of the incubation chamber 10 is coated with an insoluble hydrophilic material. Examples of the hydrophilic material include, but are not limited to, hydrophilic polymers such as poly(N-vinyl lactams), poly(vinylpyrrolidone), poly(ethylene oxide), poly(propylene oxide), polyacrylamides, cellulosics, methyl cellulose, polyanhydrides, polyacrylic acids, polyvinyl alcohols, polyvinyl ethers, alkylphenol ethoxylates, complex polyol monoesters, polyoxyethylene esters of oleic acid, polyoxyethylene sorbitan esters of oleic acid, and sorbitan esters of fatty acids; inorganic hydrophilic materials such as inorganic oxide, gold, zeolite, and diamond-like carbon; and surfactants such as Triton X-100, Tween, Sodium dodecyl sulfate (SDS), a.mmonium lauryl sulfate, alkyl sulfate salts, sodium lauryl ether sulfate (SLES), alkyl benzene sulfonate, soaps, fatty acid salts, cetyl trimethylammonium bromide (CTAB) a.k.a. hexadecyl trimethyl animonium bromide, alkyltrimethylanimonium salts, cetylpyridinium chloride (CPC), polyethoxylated tallow amine (POEA), benzalkonium chloride (BAC), benzethonium chloride (BZT), dodecyl betaine, dodecyl dimethylamine oxide, cocamidopropyl betaine, coco ampho glycinate alkyl poly(ethylene oxide), copolymers of poly(ethylene oxide) and poly(propylene oxide) (commercially called Poloxamers or Poloxamines), alkyl polyglucosides, fatty alcohols, cocamide MEA, cocamide DEA, cocamide TEA. Surfactants can be mixed with reaction polymers such as polyurethanes and epoxies to serve as a hydrophilic coating. In another embodiment, the top surface or the bottom surface of the incubation chamber 10 is made hydrophilic by atmospheric plasma treatment.

Alternatively, the bottom surface or top surface of the incubation chamber may be covered with a commercially available hydrophilic tape or film. Examples of hydrophilic tape include, but are not limited to, Adhesives Research (AR) tape 90128, AR tape 90469, AR tape 90368, AR tape 90119, AR tape 92276, and AR tape 90741 (Adhesives Research, Inc., Glen Rock, Pa.). Examples of hydrophilic film include, but are not limited to, Vistex® and Visguard® films from (Film Specialties Inc., Hillsborough, N.J.), and Lexan HPFAF (GE Plastics, Pittsfield, Mass.). Other hydrophilic surfaces are available from Surmodics, Inc. (Eden Prairie, Minn.), Biocoat Inc. (Horsham, Pa.), Advanced Surface Technology (Billerica, Mass.), and Hydromer, Inc. (Branchburg, N.J.).

In one embodiment, the hydrophilic tape or film has sufficient transparency to allow optical interrogation of the microarray from the top of the incubation chamber. In another embodiment, the hydrophilic surface is created by coating the top surface of the incubation chamber with a hydrophilic coating. In another embodiment, the hydrophilic surface is created by simply replacing the cover slip 40 with a hydrophilic tape or hydrophilic film.

In yet another embodiment, the hydrophilic surface is a hydrophilic matrix with impregnated chemicals that lyses cell membranes, denaturing proteins, and traps nucleic acids. The hydrophilic matrix would perform two functions, purification of the sample and uniformly wicking of the sample into the incubation chamber. In one embodiment, the hydrophilic matrix is FTA paper® (Whatman, Florham Park, N.J.). Biological samples are applied to the FTA® paper and cells contained in the sample are lysed on the paper. The paper is washed to remove any non-DNA material (the DNA remains entangled within the paper). The DNA is then eluted for subsequent microarray analysis. Alternatively, the bound DNA may be amplified in situ for microarray detection without an elution step.

The FTA paper® can be used as an opposing surface to the array (i.e., the top surface of the incubation chamber). Alternatively, the microarray may be printed on the FTA paper® and a transparent cover slide on top of the incubation chamber would allow visualization of the microarray. In another embodiment, PCR reagents may be introduced into the incubation chamber for amplification of a nucleic acid sample on the FTA paper®. In this embodiment, the amplification will be performed inside the incubation chamber 10.

The microarray 20 can be any type of microarray, including but not limited to, nucleotide microarrays and protein microarrays. In one embodiment, the microarray 20 is formed using the printing gel spots method described in e.g., U.S. Pat. Nos. 5,741,700, 5,770,721, 5,981,734, 6,656,725 and U.S. patent application Ser. Nos. 10/068,474, 11/425,667 and 60/793,176, all of which are hereby incorporated by reference in their entirety.

Figure 2:
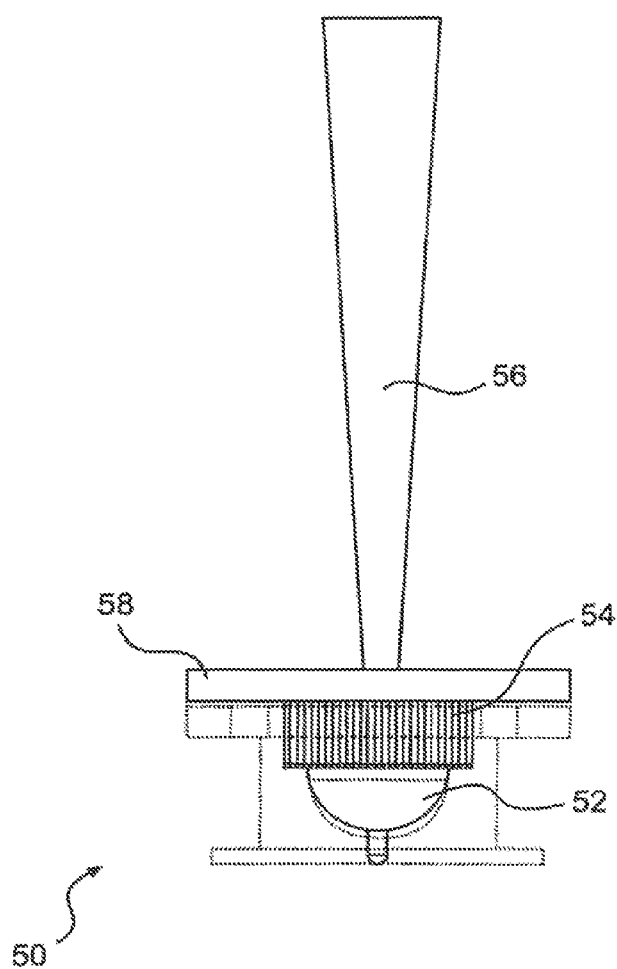
FIG. 2 is a schematic of a dome valve in a support housing with a penetrating pipette tip.

In another embodiment, the microarray system further contains a one-way valve for introducing a liquid (e.g., a sample, a hybridization buffer, or a washing buffer) into the incubation chamber 10. The sample is introduced into the incubation chamber 10 through the one-way valve to prevent environmental contamination, which is an important concern in certain applications such as the detection of biological warfare agents. The one-way valve can be a check valve or a dome valve that is placed at an inlet port of the incubation chamber 10. Dome valves of various sizes are commercially available (e.g., from Minivalve International, Yellow Springs, Ohio). In an embodiment shown in FIG. 2, the dome valve 50 contains two components: a dome-shaped valve body 52 and a back seal 54. The back seal has a hole (not shown) that allows an introducer 56 to penetrate the back seal 54. The introducer 56 may be any liquid delivering device having a pointed tip to penetrate the back seal 54. In this embodiment, the introducer 56 is a pipette tip. In another embodiment, the introducer 56 is a syringe needle.

Figure 3:
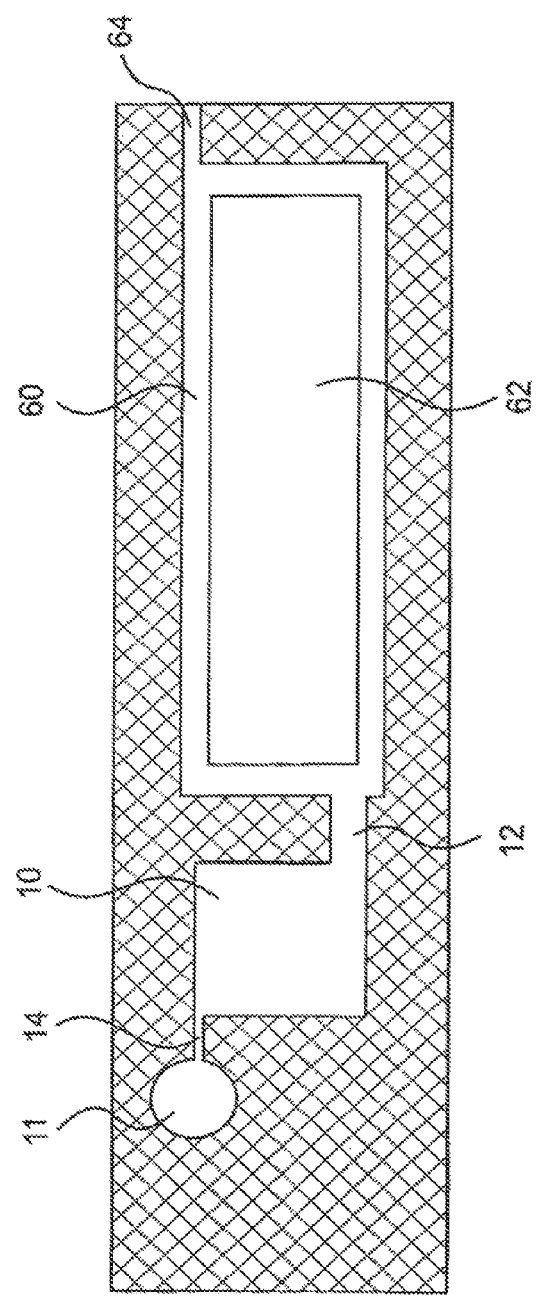
FIG. 3 is a schematic of an embodiment of a microarray system with a waste chamber.

The dome valve 50 allows easy access with the introducer 56 and conforms to the tip of the introducer 56 as the tip enters the dome valve 50 through the back seal 54. After the introducer 56 is withdrawn, the opening on the back seal 54 is spontaneously closed to prevent the sample from leaking out of the incubation chamber 10 from the dome valve 50. Therefore, the dome valve 50 acts as both a pierceable septum and a check valve. The dome valve may be installed on a microarray assembly through the supporting structure 58. In one embodiment, the dome valve is connected to the incubation chamber 10 through an inlet port 11 and inlet channel 14 (FIG. 3).

In yet another embodiment, the microarray system further includes a waste chamber. Many optical readers, such as the Aurora Photonics Port Array 5000™ microarray reader, give improved signal-to-noise ratios when reading dry images. Therefore, it is advantageous to incorporate a waste chamber into the microarray system to remove liquid from the incubation chamber before placing the microarray in a microarray reader. Referring now to FIG. 3, the incubation chamber 10 is connected to a waste chamber 60 formed on the same microarray slide.

The waste chamber 60 can be of any shape and typically has a volume that is greater than the volume of the incubation chamber 10. In one embodiment, the waste chamber is formed in a gasket tape which is then attached to the substrate 30 (See FIG. 1) on which the microarray 20 is printed. In yet another embodiment, the substrate 30 has a cut-out on its top surface. The cut-out has a size and position that match the size and position of the waste chamber 60 in the gasket 34 so that the waste chamber 60, once formed between the substrate 30 and the gasket 34, would have a depth that is greater than the depth of the incubation chamber 10. In another embodiment, the substrate 30 is made of a plastic material so that a cut-out may be easily made on the substrate 30. In yet another embodiment, both the incubation chamber 10 and the waste chamber 60 are formed in the substrate 30 without using the gasket 34. The waste chamber 60, however, may have a depth that is greater than the depth of the incubation chamber 10.

In one embodiment, the waste chamber 60 contains an absorbent 62 that, once in contact with the liquid in the incubation chamber 10, wicks the liquid from the incubation chamber 10, therefore allowing the microarray 20 to be read in a dry state.

The absorbent 62 can be any material capable of retention of a relative large quantity of liquid. In one embodiment, the absorbent 62 is made of an aggregate of fibers. In another embodiment, the absorbent 62 is a nonwoven fabric produced in a through-air bonding process. The constituent fibers of the nonwoven fabric can be hydrophilic synthetic fibers, natural cellulose fibers of pulp or the like, or regenerated cellulose fibers. The fibers may be coated or infiltrated with a surfactant or a hydrophilic oil to improve liquid absorbance. Not limited to the through-air bonding process, the nonwoven fabric for use herein may be produced in any other process such as a spun-bonding process, an air laying process, a spun-lacing process, etc. In one embodiment, the absorbent 62 is a cellulose paper (C048) from Millipore (Billerica, Mass.)

Referring again to FIG. 3, the waste chamber 60 is connected to the incubation chamber 10 through a channel 12. The channel 12 serves dual purposes. When filled with the liquid, the channel 12 provides a liquid passage way between the incubation chamber 10 and the waste chamber 60. When filled with air, the channel 12 separates the incubation chamber 10 from the waste chamber 60 and prevents premature wicking by the absorbent 62 in the waste chamber 60.

The liquid inside the incubation chamber 10 is removed by forcing the liquid inside the incubation chamber 10 into the channel 12 and establishing a contact between the liquid in the channel 12 and the absorbent 62 in the waste chamber 60. The contact may be established by applying a pressure to the liquid in the incubation chamber 10 to push the liquid out of the channel 12 or by applying a suction at a vent 64 of the waste chamber 60 to pull the liquid out of the channel 12. A pressure to the liquid in the incubation chamber 10 may be generated by applying a pressure through the dome valve 50

(e.g., using a pipette or a syringe). If the incubation chamber 10 is covered only with a hydrophilic tape or a hydrophilic film, a pressure to the liquid inside the incubation chamber 10 may be generated by simply pressing the hydrophilic tape or film that form the top surface of the incubation chamber 10. Alternatively, the contact between the liquid in the channel 12 and the absorbent 62 may be established by advancing the absorbent 62 towards the channel 12 until the absorbent 62 touches the liquid inside the channel 12.

Once a contact is established, the liquid in the incubation chamber 10 is wicked into the absorbents 62 in the waste chamber 60 through the channel 12. The flow rate of the liquid is determined by the size of the channel 12, the surface tension and viscosity of the liquid, and the wicking rate of the absorbent 62. In addition, the flow rate decreases as the absorbent becomes more saturated. The flow rate can also be controlled by the placement of the absorbent 62 in the waste chamber 60. An absorbent placed close to the outlet of the channel 12 result in higher flow rates than an absorbent placed further away. Therefore, cutting a corner off of the absorbent 62 results in a slower flow rate because of the increased distance between the outlet of the channel 12 and the absorbent 62.

Figure 4:
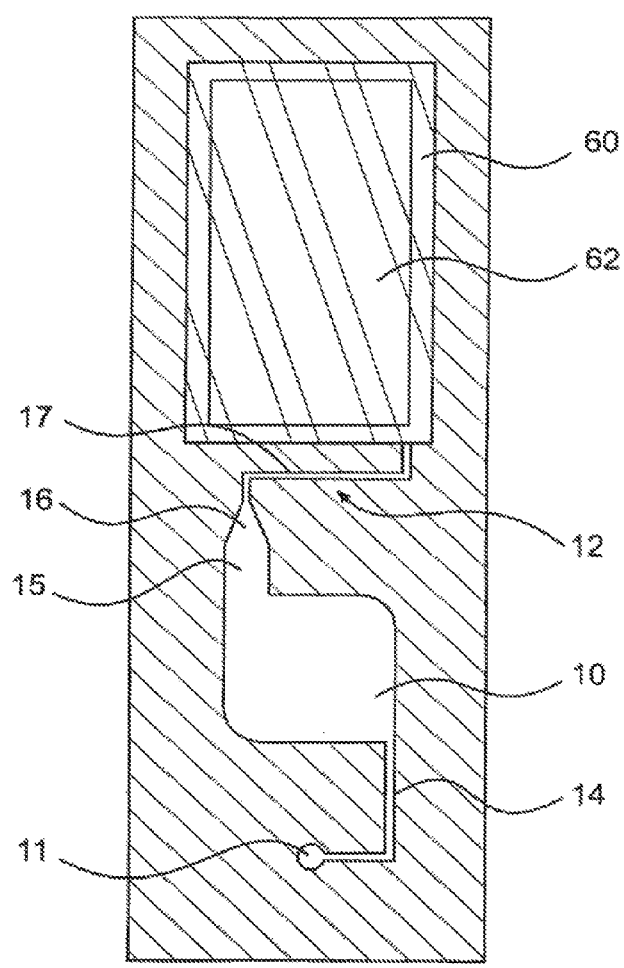
FIG. 4 is a schematic of another embodiment of a microarray system with a waste chamber.

In the event that an air bubble is introduced into the incubation chamber 10, the air bubble may be lodged in the channel 12 and partially or completely block liquid flow in the channel 12. The air bubble may also stop the wicking action of the absorbent 62 if the air bubble is located right at the interface of the liquid and the absorbent 62. This problem can be overcome with a channel design shown in FIG. 4. In this embodiment, the channel 12 includes three sections: an inlet section 15, a funnel shape connecting section 16 and an outlet section 17. The outlet section 17 has a diameter that is smaller than the diameter of the inlet section 15. The smaller diameter results in a stronger capillary pressure in the outlet section 17 compared to the pressure in the inlet section 15. The pressure difference leads to liquid movement towards the outlet section 17. In operation, the liquid already in the outlet section 17 is pushed out of the outlet section 17 and passed around the air pocket at the interface of the liquid and the absorbent 62. The funnel shape connecting section 16 offers an overflow region that prevents premature wicking due to the capillary action of the channel. In another embodiment, the outlet section 17 is further divided into two subsections, a larger diameter first section (corresponding to the horizontal portion of section 17 in FIG. 4) and a smaller diameter second section (corresponding to the vertical portion of section 17 that enters the waste chamber 60).

If the hybridization or amplification process in the incubation chamber 10 involves a heating step, such as the denaturing step of thermal cycling in a polymerase chain reaction (PCR), the liquid inside the incubation chamber 10 may be pushed out of the channel 12 and make a premature contact with the absorbent 62 due to increased pressure in the incubation chamber 10. Under these circumstances, air may be intentionally left in the channel 12 (at the time when incubation chamber 10 is filled) to prevent premature wicking by the absorbent 62. Alternatively, a hydrophobic stop may be placed inside the channel 12 to prevent premature wicking by the absorbent 62. In one embodiment, the hydrophobic stop comprises a channel section with a hydrophobic interior surface. In one embodiment, the hydrophobic surface is formed by coating or treating the native channel surface with a hydrophobic material such as Teflon®, silicone or silane. In another embodiment, the interior surface of channel 12 is coated with a hydrophilic material and the hydrophobic stop comprises a section of channel 12 that has a non-coated surface exposing the native hydrophobic plastic material.

In another embodiment, the incubation chamber 10 is connected to multiple waste chambers 62 to ensure that wicking occurs at the appropriate interval.

Figure 5:
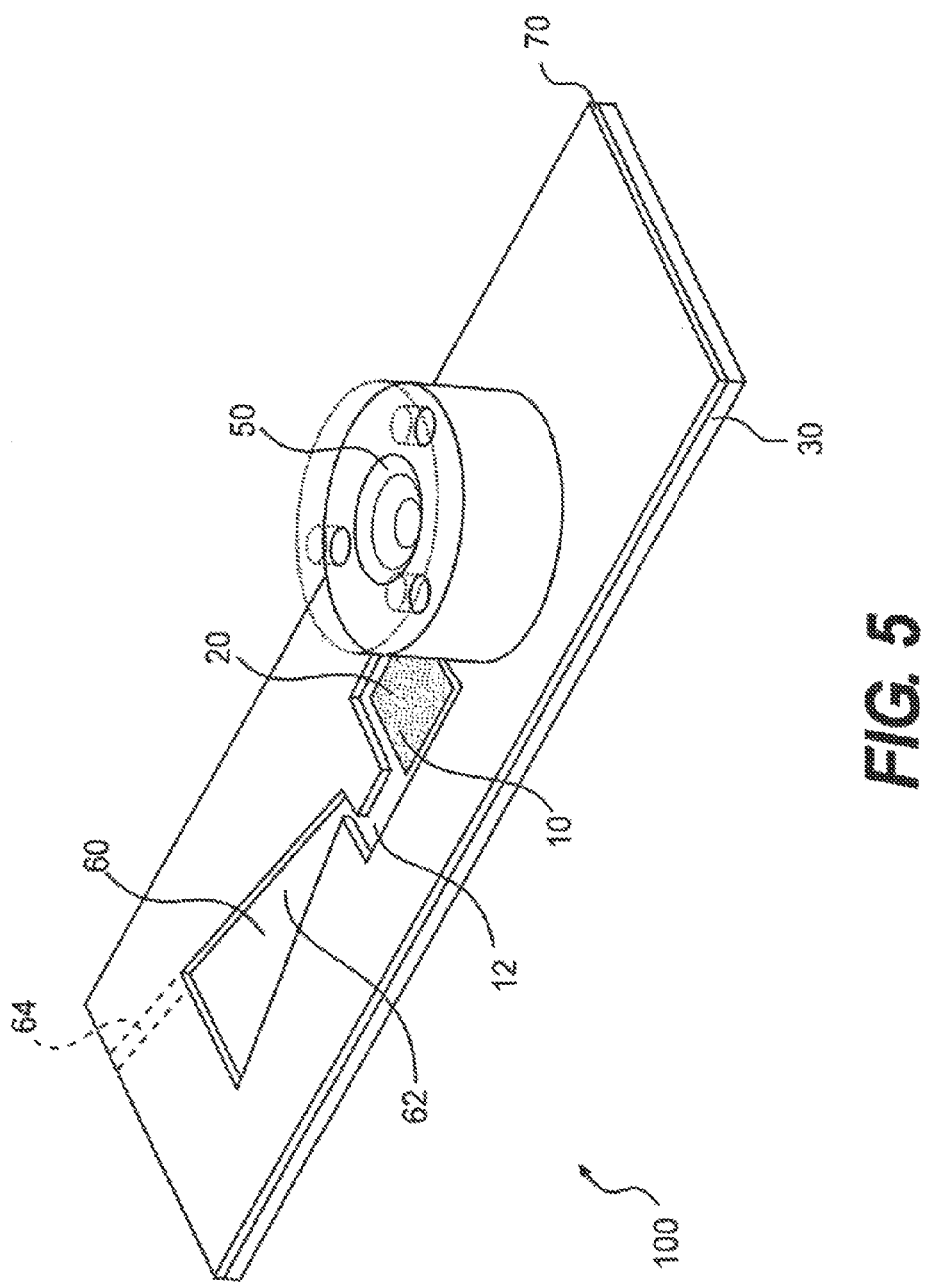
FIG. 5 is a schematic of an embodiment of an integrated microarray system.

Also described herein is an integrated microarray system having a hydrophilic incubation chamber for uniform filling, a one-way valve to prevent sample contamination, and a waste chamber for liquid removal from the incubation chamber. Referring now to FIG. 5, an embodiment of the integrated microarray system 100 includes a microarray 20 printed or formed on a substrate 30, a hydrophilic incubation chamber 10 formed around the microarray 20, a dome valve 50 in fluid communication with the incubation chamber 10 through a channel (not shown), and a waste chamber 60 connected to the incubation chamber 10 through a channel 12. An absorbent 62 is incorporated in the waste chamber 60, which is vented to the atmosphere through a vent 64. A transparent hydrophilic cover 70 forms the top surface of the incubation chamber 10 and the waste chamber 60. In one embodiment, the vent 64 is created by simply punching a hole in the cover of the waste chamber 60.

One advantage of covering the incubation chamber 10 and the waste chamber 60 with a hydrophilic tape or film is that the thin film or tape is capable of deforming under pressure. It is therefore possible to mix the liquid in the incubation chamber 10 by applying modest pressure to the waste chamber, which would cause slight deformation to the incubation chamber 10 and hence movement of liquid inside the incubation chamber 10.

EXAMPLES

Example 1

Figure 6:
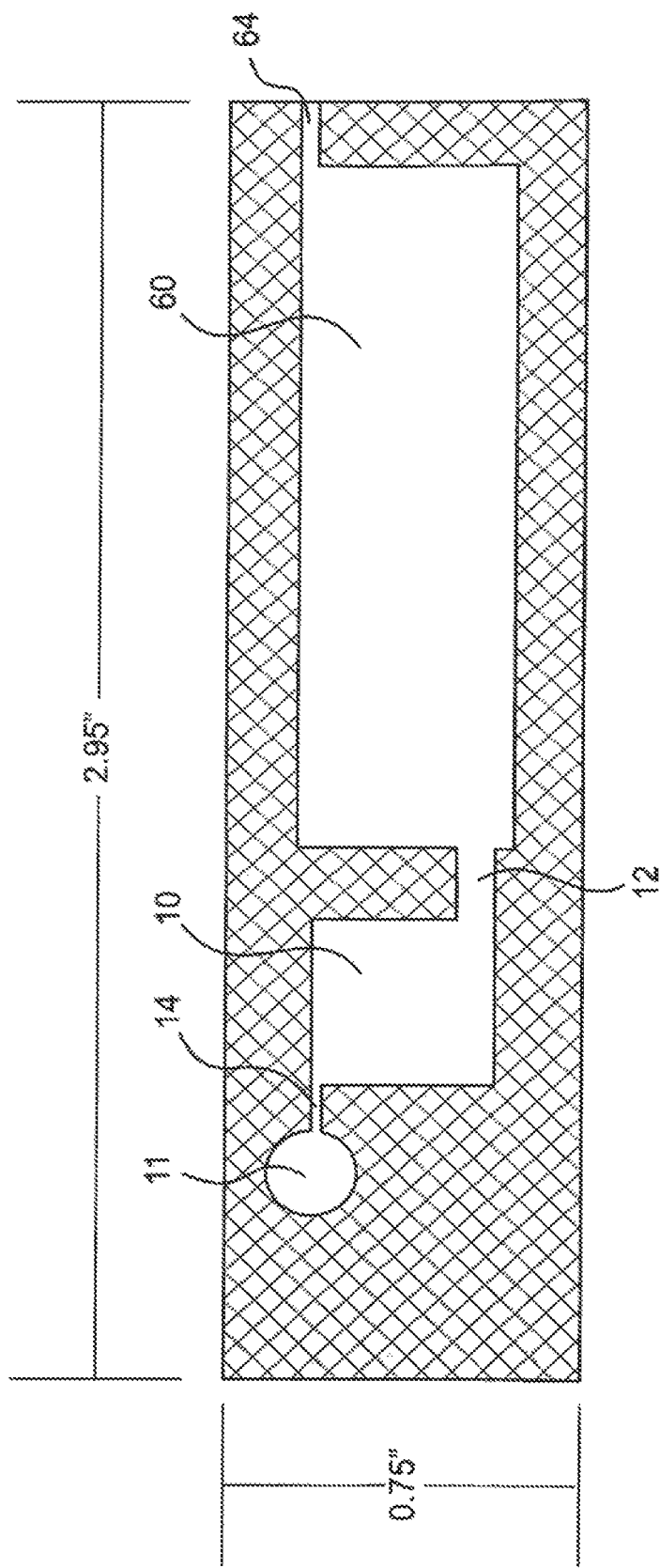
FIG. 6 is a schematic showing the dimensions of an embodiment of a microarray system.

Covering Incubation Chamber with Hydrophilic Tape Resulted in Complete Filling of the Chamber FIG. 6 shows the geometry of an embodiment of a microarray slide. The circle is a filling inlet port 11, the square is the microarray incubation chamber 10, and the long rectangle is the waste chamber 60. A channel 14 of 0.5 mm in width connects the filling inlet port 11 to the microarray incubation chamber 10, a 2.0 mm channel 12 connects the microarray incubation chamber 10 to the waste chamber 60, and a 1.0 mm channel 64 from the waste chamber 60 to the outside serves as a vent. The microarray incubation chamber 10 has a size of 10 mm×10 mm. An inner gasket tape, with a thickness of 0.25 mm (available from 3M, Part No. 9087), was laser cut to form a gasket with the geometry described above. The gasket was placed on a hydrophobic surface with a contact angle that is similar to slides used for the gel spot printing process. The top of the gasket was sealed with a hydrophilic tape (AR 90128) to provide a hydrophilic surface. Thirty microliters of water filled the chamber uniformly without leaving air bubbles or air pockets. Thirty microliters of hybridization buffer (3 M guanidine thiocyanate, 150 mM HEPES pH 7.5, and 15 mM EDTA) also filled the chamber uniformly without air bubbles. A similar test with a hydrophobic tape (AR 8192) left air pockets in the microarray chamber due to non-uniform filling.

This experiment demonstrated that the hydrophilic surface of the chamber overcomes the surface tension of the liquid and allows complete filling of the chamber, including the square edges. This result is surprising since square corners typically trap air pockets as liquid fills the chamber.

Example 2

Evaluation of the Wicking Efficiency of the Waste Chamber

Figure 7A:
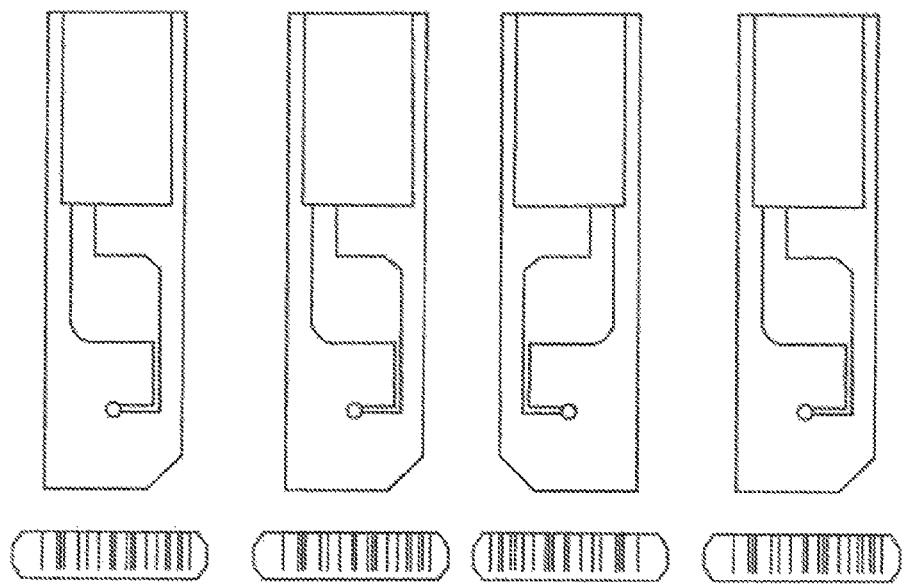
FIG. 7 is a composite of pictures showing four microarray incubation chamber assemblies (panel A) used to evaluate wicking of the liquid into the waste chamber and the hybridization results (panel B).
Figure 7B:
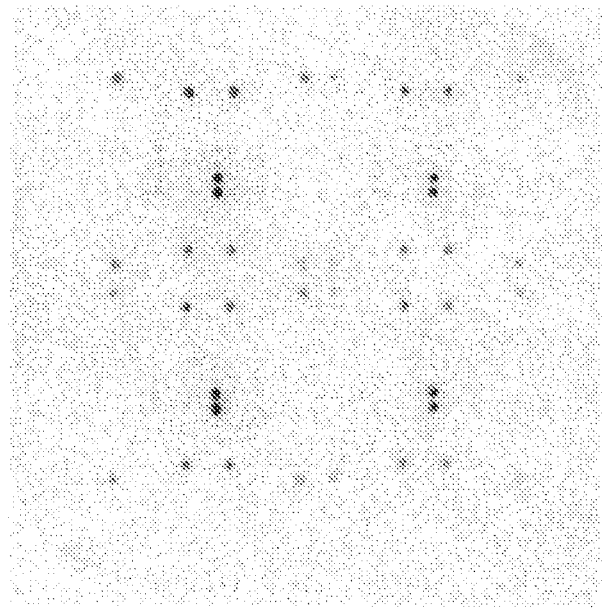
Figure 8A:
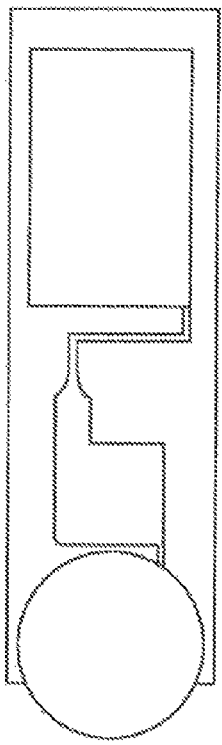
FIG. 8 is a composite of pictures showing an embodiment of an integrated microarray system (panel A) and the hybridization results from the microarray system (panel B).
Figure 8A:
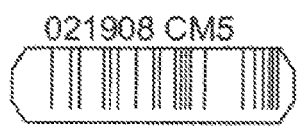
Figure 8B:
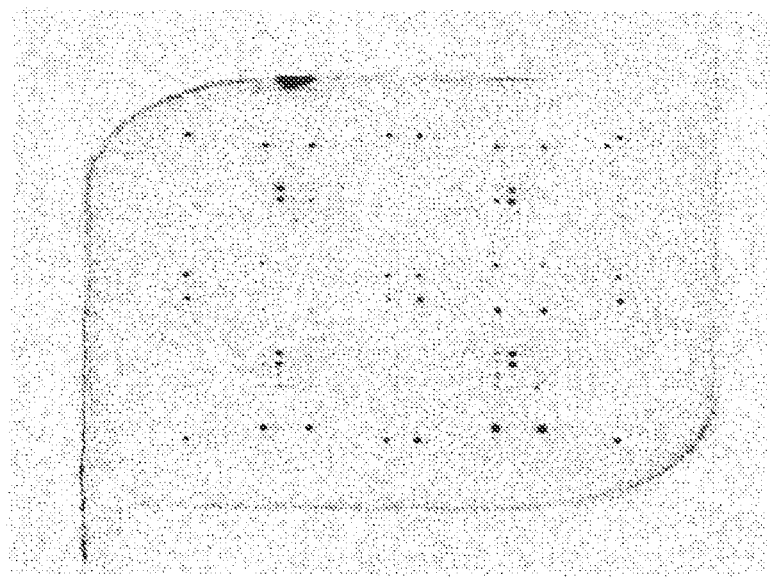

FIG. 7A shows four test microarray slides, each having a hydrophilic incubation chamber connected to a waste chamber containing an absorbent. The waste chambers were vented to atmosphere. The chambers were formed by placing a gasket (laser cut from double sided tape provided by Grace Biolab) on top of a microarray supporting slide. The hydrophilic surface in the incubation chamber was produced by covering the incubation chamber space with a hydrophilic tape (AR 90469). The absorbent was from Millipore (C048). Ninety-five microliters of sample containing amplified product from *Yersinia pestis*, hybridization markers, BSA and a hybridization buffer were denatured at 95° C. for 5 minutes and introduced into the incubation chamber through an inlet port. The inlet port was then sealed with tape (AR90697). The reaction was incubated at 50° C. for one hour in an MJ Research PTC-200 DNA Engine thermalcycler with attached slide tower. The microarray slides were removed from the tower and washed at room temperature with 150 uL of water. As water was added into the incubation chamber through the inlet port, the liquid in the incubation chamber was pushed into the waste chamber through the channel connecting the incubation chamber with the waste chamber. Once the contact was established between the liquid inside the incubation chamber and the absorbent in the waste chamber, the absorbent was able to wick out the liquid (including the washing volume) from the incubation chamber. The microarray slide was then heated at 95° C. for 20 minutes to thoroughly dry the incubation chamber. The microarray was imaged on an Aurora Photonics Port Array 5000™ without any manipulation to the device. The image was taken through the hydrophilic tape that covers the incubation chamber.

FIG. 7B shows the image of an example microarray after the hybridization, washing, and drying step. Product spots are shown as dark black dots. Control spots include Cy3 spots and hybridization markers. Each array is a replicate of four subarrays, hence the four sets of Yp product spots. Uniform hybridization was achieved in all test slides.

Example 3

Microarray System Containing a Dome Valve, a Hydrophilic Incubation Chamber and a Waste Chamber FIG. 8A shows an embodiment of an integrated microarray system having an incubation chamber covered with a hydrophilic tape, a waste chamber with incorporated absorbent, and a dome valve connected to the incubation chamber. Ninety-five microliters of sample consisting of hybridization master mix and *Yersinia pestis* product were denatured at 95° C. for 5 minutes and introduced into the incubation chamber through the dome valve with a Rainin P200 uL pipettor. The sample uniformly flowed into the microarray chamber without leaving air bubbles or air pockets. The incubation chamber was heated for 60 minutes at 50° C. on an MJ Research PTC-200 DNA Engine thermalcycler with attached slide tower without any changes to the flow cell device. The microarray slide was removed from the slide tower and washed with 150 uL of water. As the water was introduced into the incubation chamber, the hybridization mixture inside the incubation chamber was pushed into the waste chamber and the Millipore C048 absorbent wicked out the entire volume of liquid from the incubation chamber. The microarray slide was then heated at 95° C. for 20 minutes to thoroughly dry the incubation chamber. The microarray was imaged on an Aurora Photonics Port Array 5000™ without any manipulation to the device. The image was taken through the hydrophilic tape that covers the incubation chamber.

FIG. 8B shows the image of an exemplary microarray after the hybridization, washing, and drying step. Product spots are shown as dark black dots. Control spots include Cy3 spots and hybridization markers. Each array is a replicate of four subarrays, hence the four sets of Yp product spots. As shown in FIG. 8B, uniform hybridization was achieved in all subarrays.

Example 4

Microarray System Containing a Hydrophilic Incubation Chamber and a Waste Chamber FIG. 9A shows another embodiment of a microarray system having a hydrophilic chamber 10 and a waste chamber 60. The two chambers are connected by a channel 12 having an inlet section 15, a funnel shape connecting section 16, a large diameter outlet section 17 and a small diameter outlet section 172. Liquid sample is added to the incubation chamber 10 through inlet port 11 and channel 14.

The microarray system shown in FIG. 9A was constructed on a glass slide using a gasket which was laser cut from double sided tape (Grace Biolabs). The waste chamber 60 contained a filter paper absorbent (CF4, Millipore) and was vented to the atmosphere. The resulting microarray assembly was covered with Lexan HPFAF (0.007"/175 μm) antifog tape (GE Plastics). Twenty microliters (20 μl) of sample containing amplified product from *Streptococcus pyrogenase*, hybridization markers (positive control), BSA and a hybridization buffer were denatured at 95° C. for 5 minutes and introduced into the incubation chamber 10 through the inlet port 11 using a Rainin P200uL pipettor. The inlet port 11 was sealed with tape and the entire slide was allowed to incubate at 55° C. for 30 minutes in an MJ Research PTC-200 DNA Engine thermalcycler with attached slide tower. The slides were removed from the tower and washed at room temperature with 150 uL of water. The array was imaged on an Aurora Photonics Port Array 5000™ microarray reader (2 second exposure time). FIG. 9B shows the hybridization result. FIG. 9C is a chip map showing the layout of array spots. As shown in FIG. 9B, strong positive results were obtained from the hybridization control and *Streptococcus* specific probes.

Example 5

One-Step Protein Microarray System

A one-step, integrated protein microarray system, such as one of the embodiments shown in FIG. 5 and FIG. 9, is constructed using gel drop elements containing capture antibodies. The capture antibodies are antibodies that bind specifically to a panel of biological warfare agents (BWAs). Each gel spot contains an antibody that binds to a specific BWA. A set of colloidal gold labeled secondary antibodies are placed at a location near the inlet channel. The secondary antibodies recognize the same panel of BWAs. When a liquid sample is loaded into the incubation chamber through the inlet channel, the colloidal gold labeled secondary antibodies are mixed with the sample as the sample enters the incubation chamber. During incubation, the BWAs of interest are captured by the antibodies in the array gel spot and the secondary antibodies bind to the captured BWAs. After the incubation period, unbound secondary antibodies are washed away. The secondary antibodies bind to the BWAs captured on the gel spots and produce positive signals in the microarray.

The term "antibody" as used herein, is used in the broadest possible sense and may include but is not limited to an antibody, a recombinant antibody, a genetically engineered antibody, a chimeric antibody, a monospecific antibody, a bispecific antibody, a multispecific antibody, a diabody, a chimeric antibody, a humanized antibody, a human antibody, a heteroantibody, a monoclonal antibody, a polyclonal antibody, a camelized antibody, a deimmunized antibody, an anti-idiotypic antibody, and/or an antibody fragment. The term "antibody" may also include but is not limited to types of antibodies such as IgA, IgD, IgE, IgG and/or IgM, and/or the subtypes IgG1, IgG2, IgG3, IgG4, IgA1 and/or IgA2. The term "antibody" may also include but is not limited to an antibody fragment such as at least a portion of an intact antibody, for instance, the antigen binding variable region. Examples of antibody fragments include Fv, Fab, Fab', F(ab'), F(ab')$_2$, Fv fragment, diabody, linear antibody, single-chain antibody molecule, multispecific antibody, and/or other antigen binding sequences of an antibody. Additional information may be found in U.S. Pat. Nos. 5,641,870, 4,816,567, WO 93/11161, Holliger et al., Diabodies: small bivalent and bispecific antibody fragments, PNAS, 90: 6444-6448 (1993), Zapata et al., Engineering linear F(ab')2 fragments for efficient production in *Escherichia coli* and enhanced antiproliferative activity, Protein Eng. 8(10): 1057-1062 (1995), which are incorporated herein by reference.

Example 6

Two-Step Protein Microarray System

Figure 9:
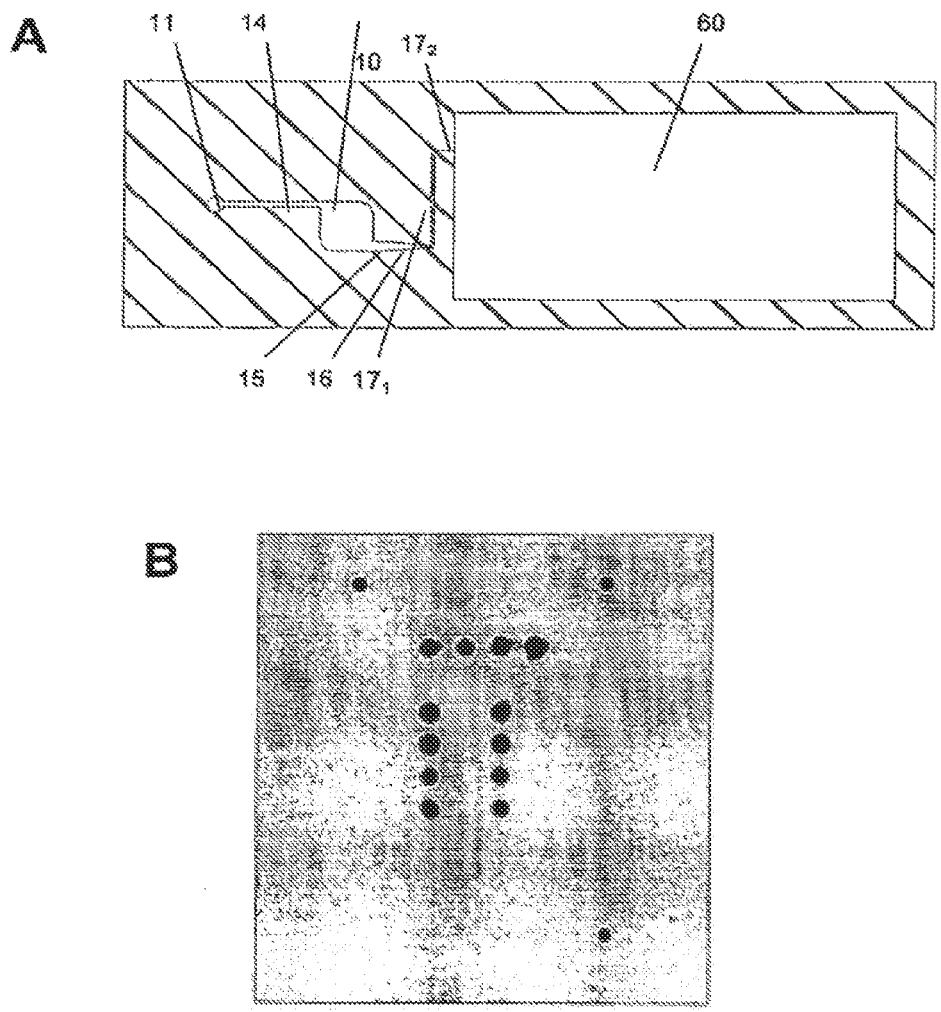
FIG. 9 is a composite showing a schematic of an embodiment of a microarray system (panel A), an array map (panel B), and the hybridization result (panel C).

A two-step, integrated protein microarray system, such as one of the embodiments shown in FIG. 5 and FIG. 9, is constructed using gel drop elements containing antibodies. Each gel spot contains an antibody that binds to a specific target. A sample is introduced into the incubation chamber and incubated in the chamber for a fixed period of time. A wash buffer is added to remove the unbound sample. The wash buffer is wicked into the waste chamber, thus removing all of the liquid from the incubation chamber. In the next step, a secondary antibody or antibodies is added to the incubation chamber and incubated for a fixed period of time. After the incubation period, unbound secondary antibodies are washed away. The secondary antibodies that bind to the targets captured on the gel spots produce positive signals in the microarray.

In this embodiment, an air bubble is left in the channel, connecting the incubation chamber to the waste chamber to separate the liquid in the incubation chamber from the waste and prevent premature wicking. When the additional wash volume is added to the incubation chamber, the unbound antibody is pushed out of the incubation chamber and wicks into the waste chamber. Multiple waste chambers ensure that wicking occurs at the appropriate interval.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A microarray system, comprising:
   a microarray formed on a planar substrate;
   an incubation chamber comprising an enclosed space formed around said microarray, wherein said incubation chamber is connected to one inlet and one outlet channel;
   a one-way valve for loading a liquid sample into said incubation chamber, wherein said one-way valve is connected to said incubation chamber through said inlet channel; and
   a waste chamber in fluid communication with said incubation chamber through said outlet channel,
   wherein said incubation chamber comprises a plurality of interior surfaces including a bottom surface on which said microarray is formed and a top surface that faces said microarray,
   wherein said top surface is a hydrophilic surface and said bottom surface is a hydrophilic surface and wherein said top and bottom hydrophilic surfaces overcome the surface tension of a water-based liquid and allows complete filling of said incubation chamber with said water-based liquid,
   wherein said outlet channel comprises an inlet section, a funnel shape connecting section, and an outlet section, wherein said inlet section has a diameter that is larger than a diameter of said outlet section, and
   wherein said waste chamber has a volume that is larger than a volume of said incubation chamber and comprises an absorbent capable of wicking liquid from said incubation chamber,
   wherein said incubation chamber is formed by placing a gasket around said microarray and covering said gasket with a hydrophilic tape or a hydrophilic film, wherein said top surface consists of the hydrophilic tape or the hydrophilic film.

2. The microarray system of claim 1, wherein said hydrophilic tape or hydrophilic film is transparent.

3. The microarray system of claim 1, wherein said bottom surface comprises impregnated chemicals that lyses cell membranes.

4. The microarray system of claim 3, wherein said bottom surface comprises a hydrophilic matrix that retains nucleic acid from lysed cells.

5. The microarray system of claim 1, wherein said one-way valve is a check valve.

6. The microarray system of claim 1, wherein said one-way valve is a dome valve.

7. The microarray system of claim 1, wherein said absorbent comprises cellulose.

8. The microarray system of claim 1, wherein said absorbent is placed at a distance from said outlet channel to control wicking rate.

9. The microarray system of claim 1, wherein said waste chamber is vented to atmosphere through a venting channel.

10. The microarray system of claim 1, wherein said substrate is glass.

11. The microarray system of claim 1, wherein said substrate is plastic.

12. The microarray system of claim 1, wherein said microarray is an oligonucleotide array.

13. The microarray system of claim 1, wherein said microarray is a protein array.

14. The microarray system of claim 13, wherein said protein array is an antibody array.

15. The microarray system of claim 1, wherein said microarray is formed by a gel spot printing method.

* * * * *